Figure 1:
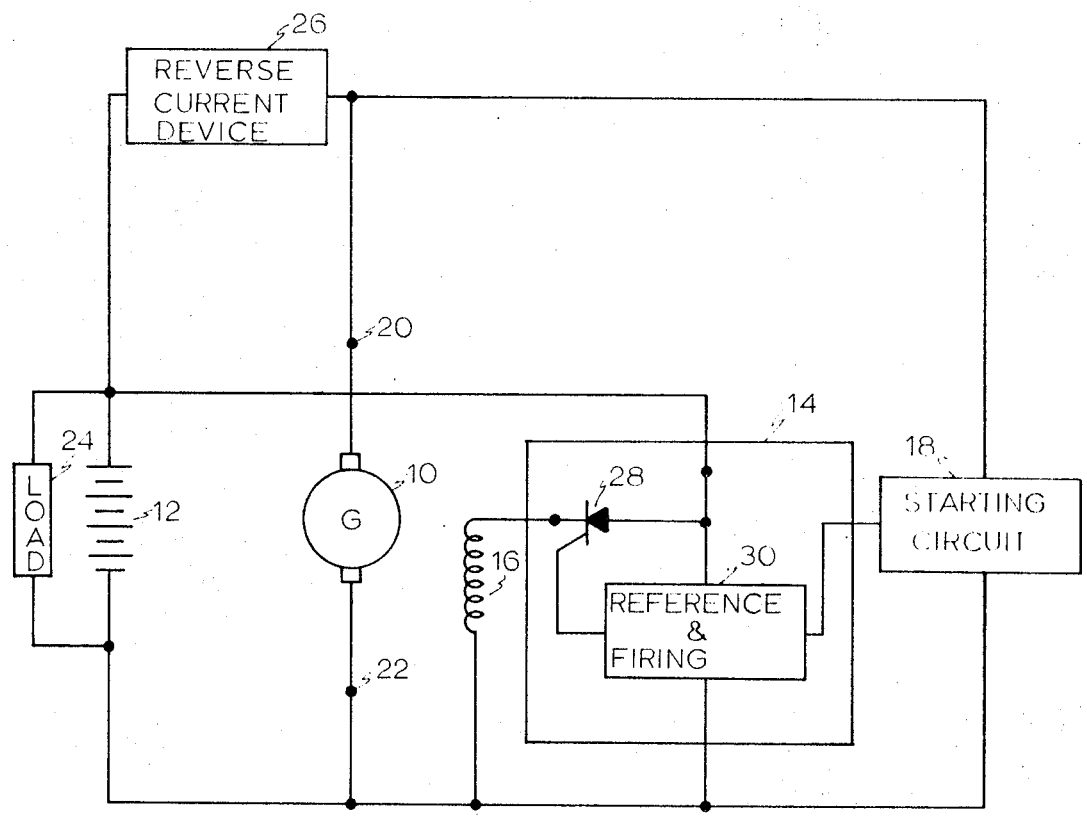

United States Patent

[11] 3,585,490

| [72] | Inventor | William B. Zelina<br>Edinboro, Pa. |
|---|---|---|
| [21] | Appl. No. | 808,478 |
| [22] | Filed | Mar. 19, 1969 |
| [45] | Patented | June 15, 1971 |
| [73] | Assignee | General Systems, Inc.<br>Erie, Pa. |

[54] VOLTAGE REGULATOR ARRANGEMENT FOR GENERATORS HAVING AUXILIARY EXCITATION MEANS
10 Claims, 2 Drawing Figs.

[52] U.S. Cl. .................................................. 322/28,
322/60, 322/73, 322/88
[51] Int. Cl. ................................................... H02p 9/30,
H02p 9/08
[50] Field of Search ........................................ 322/28, 60,
86, 88, 73

[56]  References Cited
UNITED STATES PATENTS

| 3,249,846 | 5/1966 | Steinbruegge et al. ....... | 322/60 X |
| 3,378,753 | 4/1968 | Peppinger et al. ............ | 322/60 X |
| 3,492,561 | 1/1970 | Smith et al. .................. | 322/60 X |

*Primary Examiner*—Oris L. Rader
*Assistant Examiner*—H. Huberfeld
*Attorney*—Charles L. Lovercheck, Esq.

ABSTRACT: An arrangement for causing a desired full output voltage to be produced from a generator at a lower generator speed than is possible as a result of self buildup wherein means are provided to detect when the generator armature is rotating and for causing the generator to be separately excited from a source of direct current, such as a storage battery connected to be charged from the generator, whenever the generator armature attains a preselected speed, which speed is much lower than the normal operating speed.

VOLTAGE REGULATOR ARRANGEMENT FOR GENERATORS HAVING AUXILIARY EXCITATION MEANS

This invention relates to electrical systems of the type wherein a variable speed generator is connected with a voltage regulating means and a load, which may include a storage battery arranged to be charged by the generator. More particularly the invention relates to a new and improved starting circuit for such an electrical system to provide for a desired generator output voltage at a lower generator speed than is possible as a result of self-buildup arrangements.

The invention is especially advantageous with voltage regulating electrical systems of the class used with railroad and other surface vehicles. In such electrical systems the DC generator or alternator is driven by an engine or a vehicle axle so that the speed of the generator varies and often depends upon the vehicle operation as well.

In the prior art electrical systems of the foregoing class, the armature of the generator is connected through a suitable self-buildup means to the field winding of the generator. Often this means is simply a normally closed relay contact although suitable transistor devices are used for this purpose also.

As is well known, in a self-buildup arrangement of the foregoing described type, the voltage produced as a result of the residual magnetism of the field iron of the generator is applied to the field winding which increases the magnetism of the field which increases the generator output voltage which produces a further increase in the magnetism of the generator field and so on until the desired generator output voltage has been reached. When the desired output voltage is reached the relay contact opens and the generator output is regulated at the desired constant potential by the voltage regulating means of the system.

While for many applications self-buildup arrangements are quite satisfactory, there are some applications where such an arrangement is quite unsatisfactory. This is especially so, for example, in the battery charging systems of railroad vehicles wherein the generator or alternator is driven by a vehicle axle. In a typical installation of the foregoing type, the vehicle may have to attain a speed of about 15 to 25 miles per hour before the desired generator output voltage is reached as a result of self-buildup. In many cases, especially where the vehicle must travel for extended distances at low speed, such as in congested residential or industrial areas, the machine may never reach the desired output voltage at which the relay contact would open and allow the generator to charge the battery. As a result the battery would become discharged requiring special charging attention prior to each vehicle operation.

It is an object of this invention, therefore, to overcome the foregoing prior art difficulties in an effective yet simple, reliable, and economical manner.

It is another object of this invention to provide an arrangement which is operative with the voltage regulating means of a generator system to provide for the desired generator output voltage at a lower generator speed than is possible with self-buildup arrangements.

Briefly stated, in accordance with one aspect of the invention, a new and improved starting circuit is provided for an electrical system of the class wherein a variable speed generator supplies a load means, which may include a storage battery arranged to be charged by the generator, and when the generator reaches a desired output voltage a voltage regulating means becomes operative to regulate the generator for constant potential by control of current flow in the generator filed winding. In combination with the voltage regulating means of the system there is provided a speed detecting means which is operative at a preselected low generator speed to cause the voltage regulating means to apply the battery voltage to the field winding of the generator. With the field winding thus separately excited by the battery voltage the generator reaches the desired constant potential value at a lower generator speed than is possible as a result of self-buildup.

Conveniently, the speed detecting means may employ a transistor device connected to sense the generator output voltage.

Figure 2:
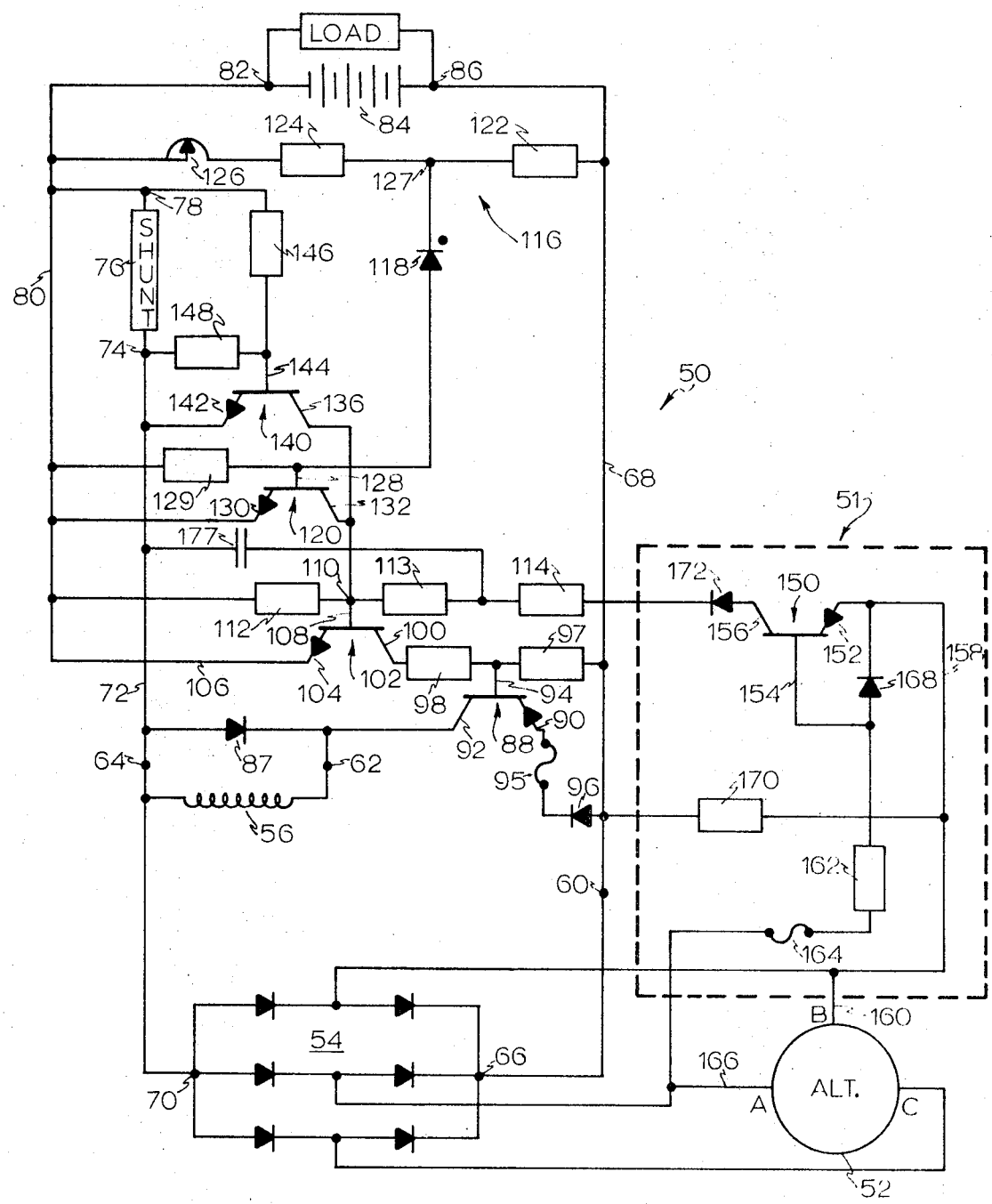

The novel features believed characteristic of the invention are set forth with particularity in the appended claims. The invention itself both as to its organization and method of operation, as well as further objects and advantages thereof, will best be understood from the following description when read in connection with the accompanying drawing in which:

FIG. 1 is a schematic circuit diagram of a battery charging system in accordance with an embodiment of the invention; and FIG. 2 is a schematic circuit diagram of a battery charging system showing a particular arrangement of the invention in combination with a particular transistor type voltage regulator.

Referring now to the drawing, there is shown in FIG. 1 a block type diagram of a battery charging system in accordance with the present invention. In such a system a variable speed generator 10 is arranged to charge a storage battery 12 and when the generator reaches a desired output voltage a voltage regulating means 14 becomes effective to regulate the generator output for constant potential by control of current flow in the shunt field winding 16 of the generator.

In accordance with this invention there is provided a novel starting circuit 18 which operates in combination with the generator 10 and voltage regulator means 14 to sense motion of the generator armature and, when a preselected generator speed is detected, cause the battery voltage to be applied to the generator shunt field winding 16 to separately excite such winding and enable the generator to provide the desired output voltage at a lower generator speed than would be possible as a result of self-buildup.

As is well known, voltage regulating means in systems of this type usually comprise a power control device and a reference means and operate to control the flow of current in the field winding and regulate the generator output voltage at a desired constant value. The control device may be, for example, a controlled rectifier wherein some firing circuit arrangement may be included, or the control device may be a transistor, or some other suitable device for controlling the current flow in the generator shunt field winding. For example, the voltage regulating means may be of the controlled rectifier type disclosed and claimed in U.S. Pat. No. 3,355,656 which is assigned to the assignee of the present invention.

In accordance with one embodiment of this invention there is provided a starting circuit 18 which detects generator speed and operates at a preselected low generator speed to cause the battery voltage to be applied to the shunt field winding. The starting circuit may comprise a transistor device connected to sense the generator output voltage and arranged so that when the generator output voltage attains a preselected value, which may be as little as about 0.6 volt for example, the transistor becomes conductive and causes the main control device to become conductive thereby applying the battery voltage to the field winding.

More specifically, there is shown in FIG. 1 the generator 10 having a shunt field winding 16 and a pair of output terminals 20 and 22. The battery 12, and any additional load means, such as 24, is connected to the generator output terminals 20 and 22 through any suitable reverse current device 26; the reverse current device being used to prevent the flow of current from the battery to the generator while allowing for the flow of current from the generator to the battery and load.

The voltage regulating means 14, shown as comprising a controlled rectifier 28 and a reference and firing circuit means 30 is also connected with the battery 12. Although not shown, it will be understood that voltage regulating means 14 will also include some means for turning off (commutating) controlled rectifier 28. Since, as illustrated, the anode and cathode elements of controlled rectifier 28 are connected in series circuit relationship with the field winding 16 and the battery 12, the battery voltage will be applied to the field winding 16 when controlled rectifier 28 is rendered conducting. Also, voltage regulating means 14 controls the flow of current in field winding 16 to regulate the generator output at a desired constant potential value.

Starting circuit 18, which may comprise a transistor device as a sensing means, is connected to the generator output terminals 20 and 22. Conveniently, the transistor device is connected to sense the output voltage of generator 10 and operate, when rendered conductive by that generator output voltage, to cause turn on of the controlled rectifier 28. From the arrangement illustrated it will be observed that this turning on of controlled rectifier 28 operates to apply the battery voltage to the field winding 16 thereby, in effect, separately exciting such generator which could be almost as soon as the generator rotates depending upon the sensitivity and the gain provided in the sensing means. By selection of a transistor device of a desired sensitivity, the transistor can become conductive at a very low generator speed. For example, a generator output voltage of only about 0.6 volts is sufficient to render one particular type of transistor device conductive and such a voltage can be produced at a vehicle speed of only about 4 or 5 miles per hour in a typical railway vehicle axle driven generator application.

From the foregoing description it can be seen that the invention provides for the application of the battery voltage to the generator shunt field winding at a low generator speed thereby separately exciting such field winding from the battery voltage and enabling the generator to produce the desired output voltage at a lower generator speed. It will also be observed that the starting circuit of this invention may be utilized with any type of voltage regulating means wherein there is provided control thereby of the current flow in the generator shunt field winding.

To provide a still better understanding of the invention and its operation there is shown in FIG. 2 a schematic circuit diagram of a battery charging system comprising a particular transistor type voltage regulating means 50 and incorporating a starting circuit arrangement 51 in accordance with the present invention.

As shown, the battery is charged from the output of a three-phase alternator 52 through a full wave rectifier 54. The output of alternator 52 is regulated at a desired constant potential value by voltage regulator means 50 which controls the current flow through the shunt field winding 56 of the alternator.

Although in FIG. 2, the invention is illustrated in circuit with a three phase alternator, those skilled in the art will understand that such illustration is by way of example only and that the invention has application with DC generators and single phase alternators. Accordingly, the term "generator" may be used hereinafter, where appropriate, as a generic term including DC generators and single and multiphase alternators.

Referring again more particularly to FIG. 2, voltage regulator means 50 has a positive terminal 60, a field terminal 62, and a negative terminal 64. Positive terminal 60 of voltage regulator means 50 is connected with the positive DC output terminal 66 of rectifier 54 and also with a conductor 68. Negative terminal 64 of voltage regulator means 50 is connected with the negative DC terminal 70 of rectifier 54 and also over a conductor 72 to one terminal 74 of a current measuring shunt means 76. The other terminal 78 of current measuring shunt means 76 is connected with a conductor 80 and to the negative terminal 82 of battery 84 whose positive terminal 86 is connected with conductor 68.

The field winding 56 is connected across terminals 62 and 64 and a freewheeling diode 87 is also connected across those terminals so as to be connected across shunt field winding 56. The output of alternator 52 is regulated at a desired constant potential value by controlling current flow through the field winding 56 in accordance with feedback signals related to the output voltage and current.

To this end, voltage regulator means 50 comprises a power control device, shown as a power transistor 88 having an emitter electrode 90 a collector electrode 92 and a base electrode 94. Emitter electrode 90 is connected through a fuse 95 and a diode 96 with positive conductor 68 while collector electrode 92 is connected with field terminal 62. Thus, the emitter-collector circuit of power transistor 88 is connected in series with field winding 56. The base electrode 94 of transistor 88 is connected through a resistance 97 with positive conductor 68 and through a resistance 98 with the collector electrode 100 of a control transistor 102. The emitter electrode 104 of transistor 102 is connected over a conductor 106 with the conductor 80. The base electrode 108 of transistor 102 is connected with a junction 110, which junction is connected through a resistance 112 to conductor 80 and also to (1) the source of current feedback signal and (2) the source of voltage feedback signal. Junction 110 is also connected through resistances 113 and 114 with the starting circuit 51 of the present invention.

The voltage feedback signal is developed from an arrangement comprising a voltage divider 116, a zener diode device 118 and a transistor 120. Voltage divider 116 is connected across conductors 68 and 80 and is made up of the series combination of fixed resistances 122 and 124 and potentiometer 126. Since conductor 68 and 80 are connected with the alternator output, a voltage appears at the junction 127 between resistances 122 and 124 which is proportional to the actual alternator output voltage. Zener diode device 118 is connected from junction 127 to the base electrode 128 of transistor 120. Base electrode 128 is also connected through resistance 129 with conductor 80. The emitter electrode 130 of transistor 120 is connected with conductor 80 while the collector electrode 132 of transistor 120 is connected with the junction 110 and also with the collector electrode 136 of a current level detecting transistor 140.

Current level detecting transistor 140 has its emitter electrode 142 connected with terminal 74 of current measuring shunt means 76 and its base electrode 144 connected through a resistance 146 with the other terminal 78 of current measuring shunt means 76. A resistance 148 is connected between the base electrode 144 and emitter electrode 142 of current level detecting transistor 140. Transistor 140 is thus connected to become conductive when the current through current measuring shunt means 76 attains a preselected value. When this value is reached, transistor 140 becomes conductive and causes transistor 102 to become nonconductive thereby removing the drive from power transistor 88 and causing it to become nonconductive.

Also, the voltage feedback signal arrangement functions to turn off power transistor 88 whenever the alternator output voltage exceeds the desired value. For example, when the output voltage exceeds the desired value zener diode device 118 breaks down to cause a signal to be applied to the base electrode 128 of transistor 120 causing such transistor to turn on which in turn causes transistor 102 to turn off and remove the drive from power transistor 88 thereby causing the power transistor 88 to turn off. From the foregoing description it can be seen that the power transistor 88 is controlled in accordance with voltage and current feedback signals to regulate the alternator output at a desired constant potential value and at a desired maximum current limit by controlling the current flow in the field winding 56.

The foregoing described operation of the voltage regulating means 50 is conventional and does not constitute per se a part of the present invention. For example, it matters not whether the voltage regulator means employs a power transistor, a silicon controlled rectifier or any other suitable power controlling device to control the current in the field winding 56. Accordingly, it is to be understood that the invention may be incorporated in any suitable voltage regulator arrangement.

In accordance with the embodiment of the invention illustrated in FIG. 2 there is provided a generator speed detecting means which comprises a transistor device 150 connected in combination with the alternator to sense the alternator output voltage and to derive an output trigger signal when only a low output voltage has been developed at a preselected low alternator rotary speed. This output trigger signal thereafter is applied to cause the power transistor 88 to become conductive thereby effectively connecting the battery 84 across the shunt field winding 56. With the battery voltage applied to field winding 56 the desired full output voltage value will be developed at a low speed since now the alternator is separately excited by the battery voltage.

For example, transistor 150 has an emitter electrode 152 a base electrode 154 and a collector electrode 156. As shown, the base-emitter electrodes are connected across one phase of the alternator output voltage. Thus, emitter electrode 152 is connected over conductor 158 with the conductor 160 associated with phase B of the alternator output while base electrode 154 is connected through resistance 162 and a fuse 164 with conductor 166 associated with phase A of the alternator output. A diode device 168 is connected between the base electrode 154 and the emitter electrode 152. Also, a resistance 170 is connected from conductor 158 to the positive conductor 68 of voltage regulator means 50. The collector electrode 156 of transistor 150 is connected through a diode 172 and through resistances 114 and 113 to the junction 110 and the base electrode 108 of control transistor 102. A capacitance 177 is connected from the junction between resistances 113 and 114 to the conductor 72. Capacitance 177 functions, because of its storage characteristic, to keep transistor on for the required periods of time even though transistor 150 is itself not on continuously since it is only associated with one phase of the three-phase alternator.

In operation as soon as the alternator output voltage reaches a value sufficient to cause the base-emitter barrier voltage of transistor 150 to be overcome, transistor 150 turns on causing base drive to be applied to transistor 102 thereby causing that transistor to turn on and in turn cause power transistor 88 to also turn on. When transistor 88 turns on, it applies the voltage of battery 84 to the field winding 56 of the alternator 52. With such voltage applied to the field winding the desired voltage output level is reached at a low speed. Transistor 150 can be made to become conductive when the alternator output voltage is as low as about 0.6 volts which voltage value can be developed at a relatively low alternator rotational speed.

For example, in one particular arrangement wherein the alternator was driven by the axle of a railway car, prior art arrangements required that the car attain a speed of about 20 miles per hour before the desired full alternator output voltage could be produced. With the arrangement illustrated in FIG. 2, on the other hand, the same equipment produced the desired full alternator output voltage at a car speed of only about 5 miles per hour.

Although in accordance with the provisions of the patent statutes, this invention has been described as embodied in concrete form and the principal has been explained together with the best mode in which it is now contemplated applying the principal, it should be understood that the apparatus shown and described is merely illustrative and the invention is not limited thereto since alterations and modifications will readily suggest themselves to persons skilled in the art without departing from the true spirit of the invention or from the scope of the appended claims.

What I claim and desire to secure by Letters Patent of the United States is:

1. In an electrical system of the class wherein a variable speed generator charges a storage battery and when the generator reaches a desired output voltage a voltage regulating means becomes effective to regulate the generator for constant potential by control of current flow in the generator shunt field winding, the combination with said voltage regulating means of a generator speed detecting means operative at a preselected low generator speed on the order of one-third or less of rated speed to produce an output trigger signal, and coupling means coupled to said storage battery and responsive to said trigger signal for applying said battery voltage to said field winding to separately excite said field winding so that the generator reaches the desired constant potential value at a lower generator speed than is possible as a result of a self-buildup.

2. The electrical system recited in claim 1 wherein said voltage regulating means includes a main regulating transistor device that also comprises the said coupling means and said generator speed detecting means is operative to render said main regulating transistor conducting at the preselected low generator speed.

3. The electrical system recited in claim 1 wherein said voltage regulating means includes a controlled rectifier that also comprises the coupling means and said generator speed detecting means is operative to render said controlled rectifier conducting at the preselected low generator speed.

4. The electrical system recited in claim 2 wherein said generator speed detecting means comprises a transistor device connected to sense the generator output voltage and operative at a preselected low generator voltage on the order of one-third or less of the normal generator operating voltage to produce the trigger signal.

5. The electrical system recited in claim 3 wherein said generator speed detecting means comprises a transistor device connected to sense the generator output voltage and operative at a preselected low generator voltage on the order of one-third or less of the normal generator operating voltage to produce the trigger signal.

6. An arrangement for producing a desired full output voltage from a generator having an armature and a field at a lower generator speed than is possible as a result of self-buildup through the selective connection of an extra source of voltage to the field comprising:
   a. Means for sensing rotary motion of said generator armature and deriving an output trigger signal in response to the generator attaining a preselected low speed on the order of one-third or less of rated speed and
   b. Means responsive to the output trigger signal derived by said sensing means for causing the extra source of voltage to be supplied to said field to cause the separate excitation thereof.

7. The arrangement recited in claim 6 wherein said extra source of voltage is provided by a storage battery connected to be charged from said generator.

8. The arrangement recited in claim 6 wherein said means for sensing rotary motion of said generator armature comprises a transistor device connected to the generator output and rendered conductive from the generator output voltage at a low voltage value on the order of one-third or less of the normal generator voltage, said low generator output voltage being produced from the residual magnetization of the field iron of said generator at a low generator speed.

9. The arrangement recited in claim 8 wherein said extra source of voltage is provided by a storage battery connected to be charged from said generator.

10. A method of producing a desired full output voltage from a generator having an armature and a field at a lower generator speed than is possible as a result of self-buildup which comprises:
   a. Providing a direct current voltage source;
   b. Detecting rotary motion of said generator armature; and
   c. Connecting said direct current voltage source across said generator field in response to said generator armature attaining a preselected low speed on the order of one-third or less of the rated speed of the generator.